United States Patent [19]

Nikaido et al.

[11] Patent Number: 5,554,413

[45] Date of Patent: Sep. 10, 1996

[54] METHOD OF MANUFACTURING ELECTRONIC DEVICE AND APPARATUS FOR MANUFACTURING THE SAME

[75] Inventors: Masaru Nikaido, Miura; Hidemi Kanetaka; Hideki Yamaguchi, both of Yokohama, all of Japan

[73] Assignee: Kabushiki Kaisha Toshiba, Kawasaki, Japan

[21] Appl. No.: 254,669

[22] Filed: Jun. 6, 1994

Related U.S. Application Data

[63] Continuation of Ser. No. 945,646, filed as PCT/JP92/00235, Feb. 28, 1992, published as WO92/15905, Sep. 17, 1992, abandoned.

[30] Foreign Application Priority Data

Feb. 28, 1991 [JP] Japan .................................. 3-059562
Nov. 1, 1991 [JP] Japan .................................. 3-287822

[51] Int. Cl.$^6$ ...................................................... B05D 5/12
[52] U.S. Cl. .......................... 427/108; 427/359; 427/370
[58] Field of Search .................................. 427/355, 359, 427/370, 108; 118/106, 120

[56] References Cited

FOREIGN PATENT DOCUMENTS

| | | |
|---|---|---|
| 61-6624 | 1/1986 | Japan . |
| 1121801 | 5/1989 | Japan . |
| 1167807 | 7/1989 | Japan . |
| 2-19802 | 1/1990 | Japan . |
| 2171703 | 5/1990 | Japan . |
| 2117118 | 5/1990 | Japan . |
| 2171703 | 7/1990 | Japan . |
| 3-61575 | 3/1991 | Japan . |

*Primary Examiner*—Katherine Bareford
*Attorney, Agent, or Firm*—Cushman Darby & Cushman, L.L.P.

[57] ABSTRACT

An electron device-manufacturing method according to the invention comprises the steps of applying a resin coating layer, containing a solvent, to one of the surfaces of a substrate, directly or with a layer interposed therebetween; drying the resin coating layer to remove the solvent; and heating and pressing the resin coating layer to smooth the surface of the same. The method is characterized in that in the step of smoothing the surface of the resin coating layer, that side of the substrate on which the resin coating layer is not coated is mechanically supported by a supporting member, and a heating roller is brought into contact with the resin coating layer to press and heat the same, with another resin film interposed therebetween, which is thinner than the resin coating layer to be smoothed, thereafter releasing the interposed resin film.

12 Claims, 9 Drawing Sheets

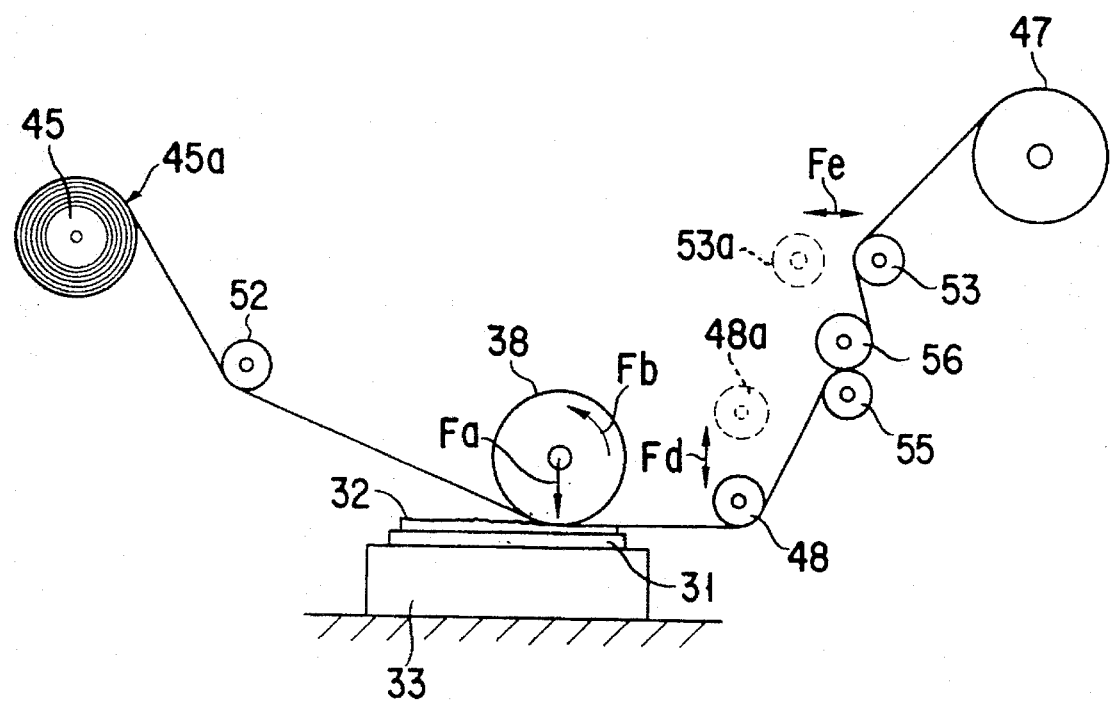
F I G. 16

1

METHOD OF MANUFACTURING ELECTRONIC DEVICE AND APPARATUS FOR MANUFACTURING THE SAME

This is a continuation of application Ser. No. 07/945,646, filed as PCT/JP92/00235 on Feb. 28, 1992, published as WO92/15905 on Sep. 17, 1992, which was abandoned.

TECHNICAL FIELD

This invention relates to a method of manufacturing electronic devices such as a color filter for use in a liquid crystal display device, a heat insulating layer for use in a thermal printing head, and a multi-layer circuit substrate for use in a hybrid IC, and a manufacturing apparatus for effecting the method, and more particularly to a method of manufacturing an electronic device which employs various smooth patterns or flat resin layers directly formed on a substrate or formed on the same with another layer interposed therebetween, and an apparatus for effecting the method.

BACKGROUND ART

A color liquid crystal display device is one of typical electronic devices. The structure of the display device will be explained as an example. In the device, a color filter is provided on one side of a liquid crystal layer. A printing method can be used to manufacture the color filter. In this method, color inks dispersed pigments in a resin solvent are printed on a transparent glass substrate in the shape of dots or stripes. This method is suitable for lowering the required cost and increasing the mass productivity.

Specifically, in the printing method, color inks, red (R), green (G), and blue (B), are printed on a glass substrate in the shape of a desired pattern, by means of a gravure offset printing system equipped with a blanket of a cylinder press type. FIG. 1 is a cross sectional view of a color filter obtained after printing and drying treatments. As can be understood from FIG. 1, first, a light-insulation black layer BM is formed on a glass substrate 21 in the shape of a matrix. Then, a stripe of a red ink layer R is printed in one of the regions in which the black layer BM is not formed substantially, by rotating the cylinder press-type transfer blanket and moving the same from the to the in the figure. Subsequently, a green ink layer G is printed in that region located adjacent to the region coated with the red ink layer R which is not coated with the black layer BM substantially, and then a blue ink layer B is printed in a manner similar to the above. As is shown in FIG. 1, the surface of each of the three color ink layers is arcuate in a state in which the layers are printed on the glass substrate. In other words, the thickness of each color ink layer is minimum at its both opposite boundary regions, and maximum at its central region.

In this state, unevenness in color may be caused, and therefore a color liquid crystal display of high quality cannot be obtained. Thus, it is necessary to make smooth the surface of each color ink layer. Various methods of smoothing the uneven surfaces of resin layers have been proposed. As one of those methods, a method of smoothing the surfaces of color ink layers by means of a wrapping film having fine particles is known from Published Unexamined Japanese Patent Application No. 61-3122. Further, according to another method as disclosed in Published Unexamined Japanese Patent Applications Nos. 63-216028 and 1-167807, the convex portions of color ink layers are heated and then smoothed by pressing with the use of a rubber or a planished metal roller. Moreover, Published Unexamined Japanese Patent Applications Nos. 2-251816 and 62-280805 disclose a method of smoothing color ink layers formed on the glass substrate of a color filter, by bringing the layers into contact with a flat plate or a machine plate, directly or with a releasable film interposed therebetween, and pressing by the use of a press roller or the machine platen from the side of the glass substrate.

Specifically, in the method disclosed in Published Unexamined Japanese Patent Application No. 62-280805, as is shown in FIG. 2, color ink layers R, G, and B of a color filter are brought into contact with a machine platen 22, and are pressed with a press roller 23 placed on the reverse side of a glass substrate 21. Further, these publications disclose a method of applying, between the machine platen 22 and color ink layers, a film not liable to stick thereto or a releasing agent, and a method of rotating and moving the press roller 23.

PROBLEM THE INVENTION TO SOLVE

The above-described conventional methods are advantageous in that the entire color-ink-coated surface is uniformly pressed, and hence uniformly smoothed. However, since a pressure is applied from the side of the glass substrate, and is applied indirectly to the color ink layers, it is necessary to apply such a low pressure as will not break the glass substrate. Especially, the glass substrate is liable to be broken when it is pressed by a press roller. Thus, in such a case, a further lower pressure must be applied. On the other hand, in the method of pressing the substrate by the use of a flat platen, though the substrate is not easily broken, a rather high pressure is required for satisfactorily pressing the entire surfaces of color ink layers. Thus, in those methods, gaps g may remain between the color ink layers. These gaps g may cause, at the time of assembling of a liquid crystal display device, gaps or babbles between the glass substrate and another glass plate for forming electrodes or glass deflection plate, or may make it impossible to adhere such glass plates to each other accurately. Moreover, in a case where a transparent conductive ITO film (indium-tin oxide film) is formed by sputtering on color ink films adhered to a filter substrate, directly or with an overcoat layer interposed therebetween, if the surfaces of color ink layers are uneven, sputtering may be insufficiently performed or no sputtering may be performed on thick portions of the surfaces of the color ink layers, resulting in wire breakage. This may adversely affect manufacture of an electronic device or the characteristics of the same. In addition, light scattering due to unevenness of the surfaces of color ink films may reduce light transmission or cause other optical losses.

To completely eliminate such gaps g from the surfaces of color ink layers, a higher pressure must be applied, or press treatment must be continued a rather long time. This is disadvantageous in view of productivity, since it requires complex control of the temperature of the color ink layers and the viscosity of them. Further, though application of a releasable film between a platen and color ink layers is effective, it may, on the other hand, allow air to remain in depressions existing between the color ink layers, which causes cavities in the layers or unevenness of the surfaces of them, or causes stripes to be formed on the surfaces due to forcible exhaustion of the air remaining in the depressions.

As described above, the conventional manufacturing methods and apparatuses have defective points to be improved, though they have not a few advantages.

DISCLOSURE OF THE INVENTION

It is the object of the invention to provide a method of manufacturing an electronic device with a smooth resin layer at a relatively high speed by applying a relatively low pressure, and to provide a manufacturing apparatus for effecting the method therein.

The invention provides an electron device-manufacturing method comprising the steps of applying a resin coating layer, containing a solvent, to one of the surfaces of a substrate, directly or with a layer interposed therebetween; drying the resin coating layer to remove the solvent; and heating and pressing the resin coating layer to smooth the surface of the same. The method is characterized in that in the step of smoothing the surface of the resin coating layers, that side of the substrate on which the resin coating layer is not coated is mechanically supported by a supporting member, and a heating roller is brought into contact with the resin coating layer to press and heat the same, with another resin film interposed therebetween, which is thinner than the substrate, thereafter releasing the interposed resin film.

The invention also provides an electron device-manufacturing apparatus comprising: a supporting member for mechanically supporting that side of a substrate to be treated which is opposite to a side on which a resin coating layer is provided with a layer interposed therebetween; a heating roller located opposed to a substrate-supporting portion of the supporting member, and being rotatable while heating and pressing the resin coating layer on the substrate; supply means for supplying a thin resin film between the heating roller and the resin coating layer on the substrate supported by the supporting member; and releasing means for releasing the resin film applied on the resin coating layer on the substrate.

The above electron device-manufacturing method and apparatus can produce, by applying a relatively low pressure, an electron device which has a very smooth resin coating layer. Though another resin film is interposed between a heating roller and a resin coating layer to be smoothed, the interposed resin film is much thinner than the substrate, and hence the invention can provide an effect substantially the same as that obtained by directly pressing the resin coating layer with the heating roller. Thus, the resin coating layer is pressed while being efficiently heated to a temperature substantially identical to its softening point. That is, the smoothing treatment is performed at a high thermal efficiency with a relatively low pressure, thereby increasing the treatment speed and mass productivity. Further, the resin layer is disposed to obliquely contact the resin coating layer to be smoothed, and to be obliquely pulled up after the entire surface of the resin coating layer is smoothed, thereby being instantly released from the coating layer. Therefore, no air will remain in the surface of the coating layer, and hence unevenness of the surface due to remaining air will not be found. Also, no wrinkles or the like will be caused on the surface, resulting in a very smooth resin coating layer.

BRIEF DESCRIPTION OF THE DRAWINGS

FIG. 16 is a schematic side view, showing a further embodiment of the invention.

BEST MODE OF CARRYING OUT THE INVENTION (Embodiment 1)

Figure 1:
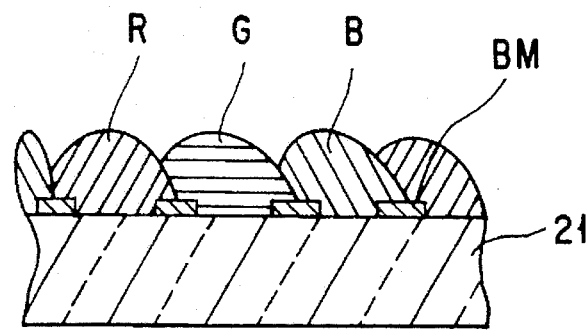
FIG. 1 is an enlarged cross sectional view, showing an essential part of a general color filter in a manufacturing process by printing method.
Figure 2:
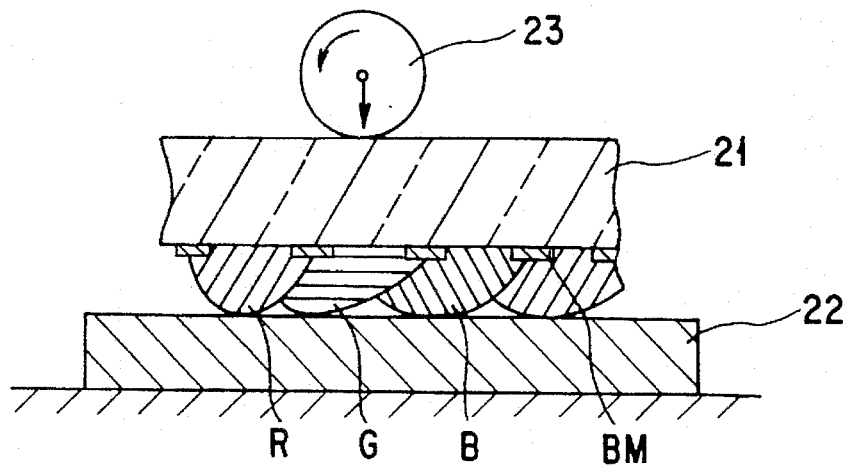
FIG. 2 is a cross sectional view, showing an essential part of a smoothing process performed after the process of FIG. 1.
Figure 3:
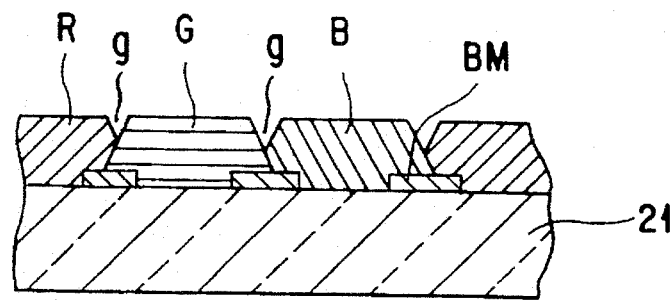
FIG. 3 is a cross sectional view, showing an essential part of a structure obtained after the smoothing process of FIG. 2.
Figures 4A, 4B:
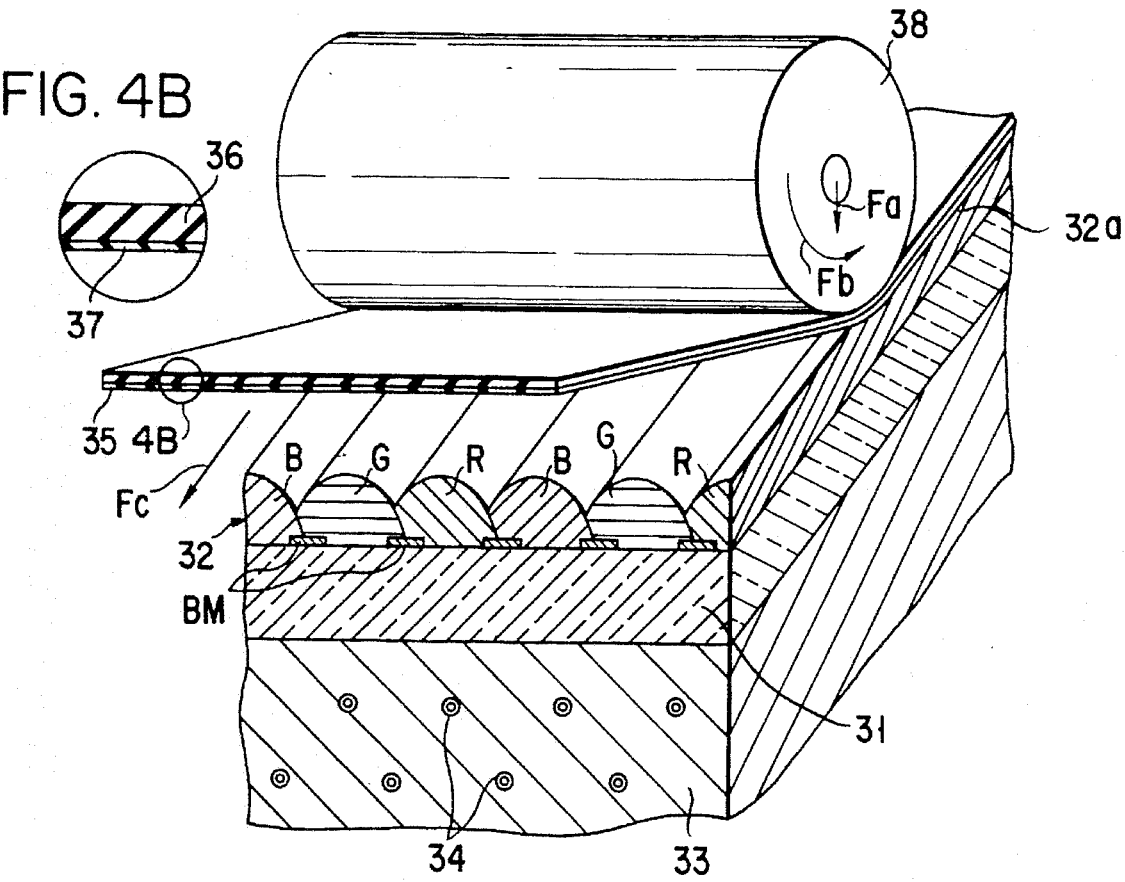
FIGS. 4A and 4B are a perspective view, showing an essential part of a manufacturing method and a manufacturing apparatus according to a first embodiment of the invention.

FIG. 4 is an enlarged view, showing part of an embodiment in which the invention is applied to a method of manufacturing a color filter for use in a color liquid crystal display, and to an apparatus for manufacturing the color filter.

First, light-insulation layers BM made of chrome were provided in the form of matrix on a rectangular transparent glass substrate 31 having a length of 32 cm, a width of 30 cm, and a thickness of 1.1 mm. Then, the surface of the substrate was washed, and a color ink layer 32 was printed on the substrate in the shape of stripes according with the intaglio cell pattern by using a gravure offset printer, using color inks containing a epoxyresin-based varnish as a main component, a pigment, and a solvent. The color ink layer 32 was formed by successively printing a red (R) layer, a green (G) layer, and a blue (B) layer. Always center of these ink layers appear conves since they had viscosity. The thickness of the swollen portion is 4–5 μm.

After forming the color ink layer 32, drying treatment was performed at a temperature falling within a range of 100°–150° C., at which the layer will not be thermo hardened, thereby removing part of the solvent. The amount of that part of the solvent which is removed is not less than 60% of the entire solvent, and more preferably not less than 80%. If the removal amount is not more than 60%, air caused by evaporation of the solvent may flow into the film when the film is smoothed.

After printing and drying treatments, the color filter was placed on a heating plate 33, with its glass substrate 31 kept in contact with the plate by means of a vacuum chuck (not shown). A heater 34 was buried in the plate 33, and kept the surface of the same at a predetermined temperature. A heating/pressing roller 38 was provided above the plate 33, and had a built-in heater (not shown) for keeping the surface of the roller at 80°–120° C. The roller 38 had a diameter of 12 cm, was made of silicon rubber having a surface JIS-A hardness of 70, and a surface roughness Ra of not more than 0.1 μm. The surface hardness of the roller preferably falls within a JIS-A hardness range of 40–90, though an optimal hardness is determined also in view of the hardness of a resin component contained in the ink. If the hardness is lower than JIS-A hardness 40, it is difficult to make the surface roughness of a smoothed color ink film not more than 0.1 μm. On the other hand, if the hardness is higher than JIS-A hardness 90, glass will easily be broken.

A resin film 35 was interposed between the color ink layer 32 and roller 38. The film 35 consists of a polyethylene telephthalate (hereinafter called "PET") film 36 having a thickness of 10–50 μm, e.g. 25 μm, and a silicone-based releasing layer 37 having a thickness of 1 μm or less, e.g. several thousands angstroms, and applied on the lower surface of the PET film. While the color ink layer 32 was being heated at about 90° C., the heating roller 38 was pushed down in the direction indicated by the arrow Fa to press the layer 32, and simultaneously the roller 38 was rotated in the direction indicated by the arrow Fb and the plate 33 is moved in the direction indicated by the arrow Fc. That is, the color ink layer 32 was continuously smoothed in the longitudinal direction, i.e., in the direction Fc, by the roller 38. In this smoothing process, the resin film 35 was located such that it could contact the layer 32 at a certain angle. As a result, the layer 32 was smoothed by the roller 38, while air existing in depressions of the layer 32 was being pushed out. A preferable angle between the surfaces of the color ink layer 32 and the resin film 35 falls within a range of 5°–80° C. The portion of the layer 32 which had been smoothed by the heating roller 38 and was coated with the resin film 35 was heat-insulated, and hence it was prevented from uneven distribution of temperature. This prevents wrinkles or the like from being caused on the surface of the color ink layer 32 in a later releasing process. The heating roller 38 applied a pressure of 10–15 Kg/cm to the film 32, and the heating plate was moved at a speed of 5–8 cm/min.

Figure 6:
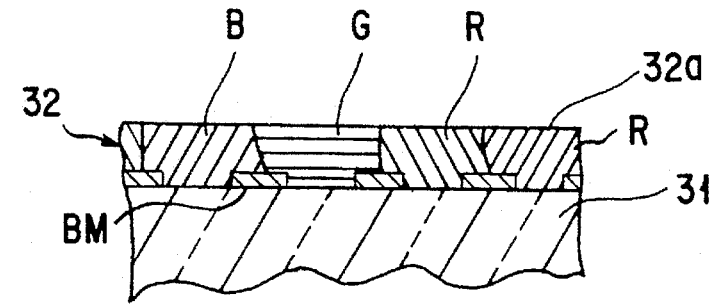
FIG. 6 is a longitudinal sectional view, showing an essential part of a color filter obtained by the embodiments of the invention.

Immediately after smoothing the entire surface of the layer 32, the resin film 35 was instantly released from the layer 32 by being moved upward at an angle with the use of a releasing roller (not shown). Thereafter, the glass substrate 31 of the color filter was detached from the plate 33, and was subjected to heating at 200°–250° C. for several hours, thereby thermo hardening the color ink layer 32. Thus, a color filter having the color ink layer 32 whose surface 32a was smoothed as shown in FIG. 6 was obtained. The thickness of the smoothed color ink layer 32 was 3.0 μm.

The pattern of the color ink layer is not limited to a stripe pattern as above, but may be a pattern in which rectangular color elements are aligned regularly. Also in this case, it is desirable to smooth the layer by moving the rotating heating roller in the longitudinal direction of the color elements. Further, square or circular color elements may be employed. In these cases, the direction of smoothing is optional.
(Embodiment 2)

Figure 5:
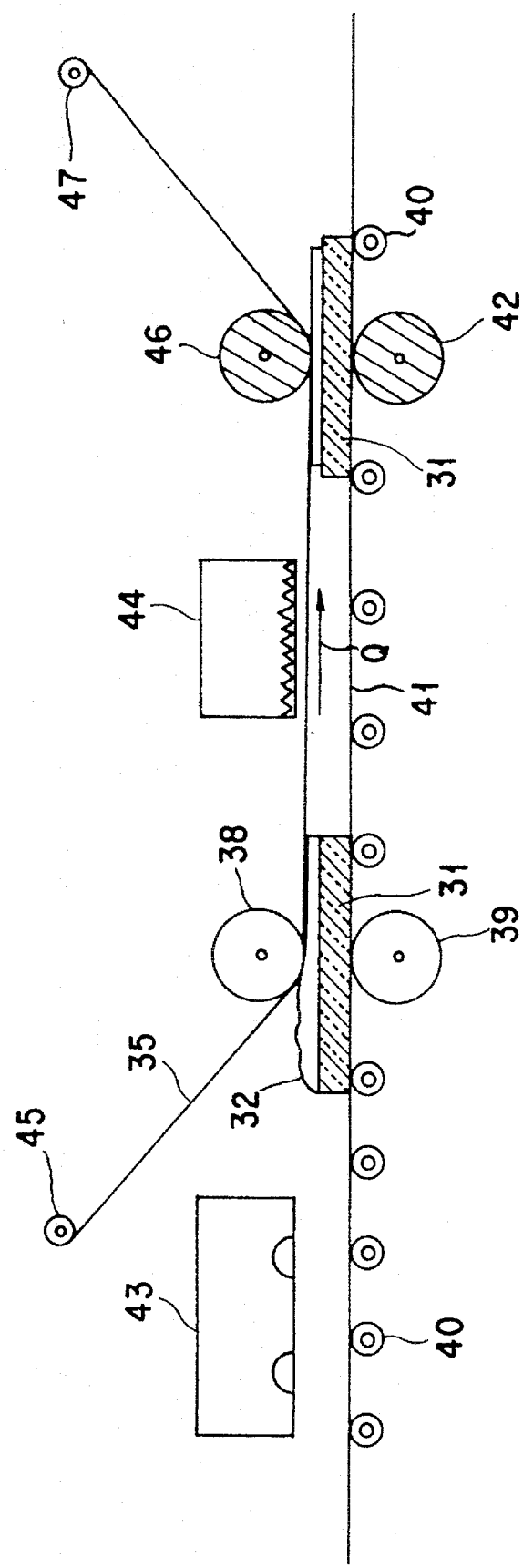
FIG. 5 is a schematic side view, showing another embodiment of the invention.

FIG. 5 shows an apparatus for performing an effective and continuous treatment. This apparatus has a plurality of supporting rollers 40, a lower-surface-heating roller 39 provided at a predetermined location, a film-releasing roller 42, and a belt conveyer 41 provided on these rollers. The glass substrates 31 of color filters to be smoothed are placed on the belt conveyer 41 at regular intervals. An upper-surface-heating/pressing roller 38 is located above the heating roller 39. A preliminary heating furnace 43 is provided upstream of the rollers 38 and 39, for preliminarily heating the color filters. A resin film 35 coated with a releasing agent is disposed such that it is forwarded from the film-forwarding roller 45 and wound by a film-winding roller 47 through the upper roller 38 and the film-releasing roller 46. Also in this embodiment, the resin film 35 is disposed to obliquely contact the color ink layer 32 to be smoothed. The heating roller 38 and film-releasing roller 46 are arranged in a single dimension, thereby keeping the resin film 35 on that portion of the color ink layer 32 which has been smoothed. The above-described structure is employed also in other embodiments, hereinafter referred to. Further, in this embodiment, a cooling fun 44 is provided between the heating rollers 38, 39 and the film-releasing rollers 42, 46, for cooling color filters after the smoothing treatment.

After the smoothing treatment, the glass substrate 31 with the color ink layer 32 is cooled during passing under the cooling fun 44, and then the resin film 35 is continuously released from the color filter placed on the moving conveyer by means of the film-releasing roller 46 and the film-winding roller 47 located at an angle above the roller 46.

Thereafter, ink is thrmo hardened, thereby providing a color filter having the surface 32a smoothed, as is shown in FIG. 6. Then, an ITO film serving as an opposed electrode of the liquid crystal display apparatus is formed directly on the color ink film 32, or is formed thereon with an overcoat layer interposed therebetween. Moreover, in the invention, the color ink layer 32 has a high smoothness, and hence good optical and electrical characteristics can be obtained without forming the overcoat layer.
(Embodiment 3)

Figure 7:
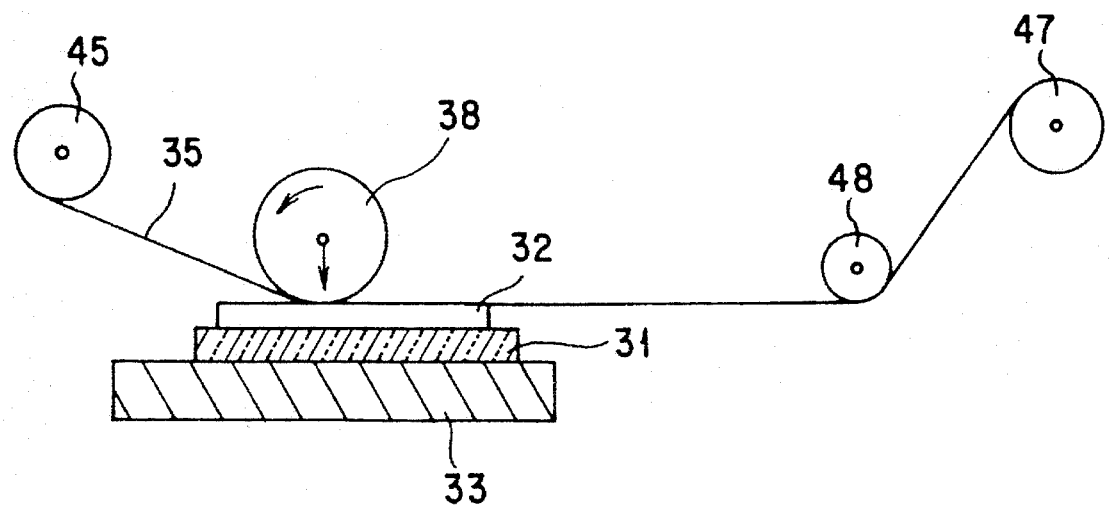
FIG. 7 is a schematic side view, showing a further embodiment of the invention.

In the apparatus shown in FIG. 7, the glass substrate 31 of a color filter is placed on a flat heating plate 33 by vacuum pressure. A heating roller 38 is moved on a color ink layer 32, while rotating and pushing the same with a resin film 35 interposed therebetween, thereby smoothing the layer 32. The resin film 35 is disposed to pass a movable film-releasing roller 48 located in an extension line of the surface of the layer 32, and then to be wound by a winding roller 47. After the entire surface of the layer 32 is smoothed by the heating roller 38, the movable film-releasing roller 48 is moved up, thereby obliquely pulling up the resin film 35 to release the film 35 from the layer 32.
(Embodiment 4)

Figure 8:
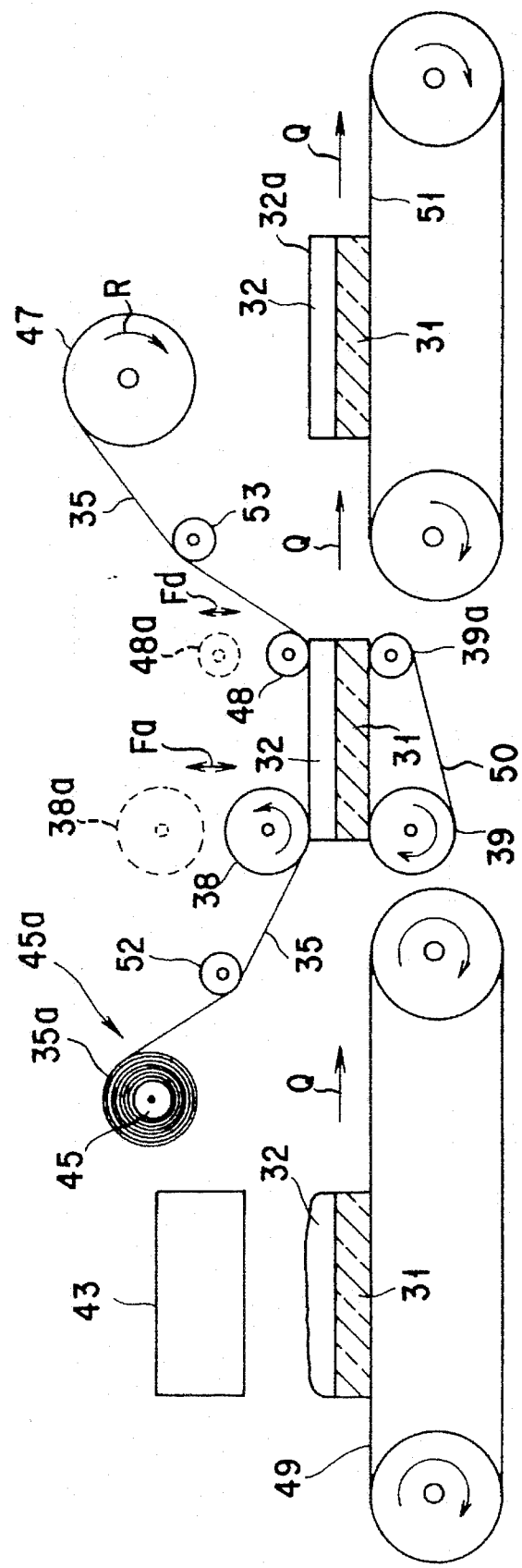
FIG. 8 is a schematic side view, showing another embodiment of the invention.

In the apparatus shown in FIG. 8, a first belt conveyer 49, a second belt conveyer 50, and a third belt conveyer 51, which are movable in a direction indicated by the arrow Q, are arranged in a single dimension with predetermined intervals between the conveyers 49 and 50 and between conveyers 50 and 51. The first belt conveyer 49 transfers a glass substrate 31 with that resin film or color ink layer 32 which has not been smoothed yet. The second belt conveyer 50 transfers the substrate 31 in a smoothing process, and the third belt conveyer 51 transfers the substrate 31 after the smoothing process. An infrared heating device 45 for preliminary heating is provided above the first belt conveyer 49. A lower supporting roller 39 for driving the second belt conveyer 50 cooperates with an auxiliary roller 39a to support the conveyer 50, and serves also as a heating roller. An upper heating/pressing roller 38 provided above the lower heating/supporting roller 39 can move in the vertical direction Fa, to a position 38a indicated by the broken line. Similarly, a movable film-releasing roller 48 can move in the vertical direction Fd, to a position 48a indicated by the broken line. A film-forwarding roller 45 made of plastic and wound with a resin film 35 is located at an angle leftward above the upper heating roller 38. A roller 52 for preventing meandering of the film 35 is provided between the film-forwarding roller 45 and heating roller 38. The rollers 45 and 52 form a resin film supply 45a. The roller 45 is provided with a driving device for driving the roller 45 in a reverse direction, a damping mechanism, a powder brake, etc., and is controlled by a control device. Also in this embodiment, the resin film 35 is disposed to be able to obliquely contact the color ink layer 32 to be smoothed. A film-pulling roller 53, serving also as a meandering preventing roller, and a winding roller 47 for winding the resin film 35 are provided at an angle rightward above the film-releasing roller 48. The winding roller 47 has a torque motor, and a damping mechanism, and is controlled by a control device.

To smooth the resin layer by the use of the above apparatus, the glass substrate 31 of a color filter is placed on the belt conveyer 49, with that resin layer or color ink layer 32 of the filter which is to be smoothed facing upward. Preliminary heating is performed using the infrared heating device 3. When the glass substrate 31 is transferred onto the second belt conveyer 50, the heating/pressing roller 38 is moved downward, and contacts the color ink layer 32 on the substrate 31, with the resin film 35 interposed therebetween. The roller 38 presses the layer 32 with a predetermined force from upward, and rotates in synchronism with the rotation of the belt conveyer 50. The film-releasing roller 48 is located in an extension line of the surface of the color ink layer 32. When the roller 48 is moved on the substrate 31, the resin film 35 is pulled at a given speed from upward at an angle, and is released from the substrate 31. The pulled resin film 35 is wound by the winding roller 47. During the above operation, a tensile force acting upon the resin film 35 is controlled by the driving device for reverse rotation and damping device employed for the film-forwarding roller 45, and the torque motor and damping mechanism employed for the winding roller 47. Thus, the resin film 35 is prevented from being thermally expanded, thereby avoiding occurrence of wrinkles on the color ink layer 32 due to thermal expansion of the resin film 35.

This embodiment is performed under the following conditions with the use of the following materials:

Color ink: mainly consisting of an epoxy resin-based varnish containing an organic pigment and a solvent;

Drying temperature of the color ink film: 70°–110° C.;

Resin film: consisting of a biaxial PET having a thickness of 25–40 μm and coated with a releasing agent made of addition-type silicone;

Smoothing conditions:

Preliminary heating temperature . . . 85°–100° C.

Temperature of the heating roller . . . 85°–100° C.

Pressure (linear pressure) . . . 10–15 Kg/cm

Forwarding speed . . . 5–8 cm/min (Embodiment 5)

Figure 9:
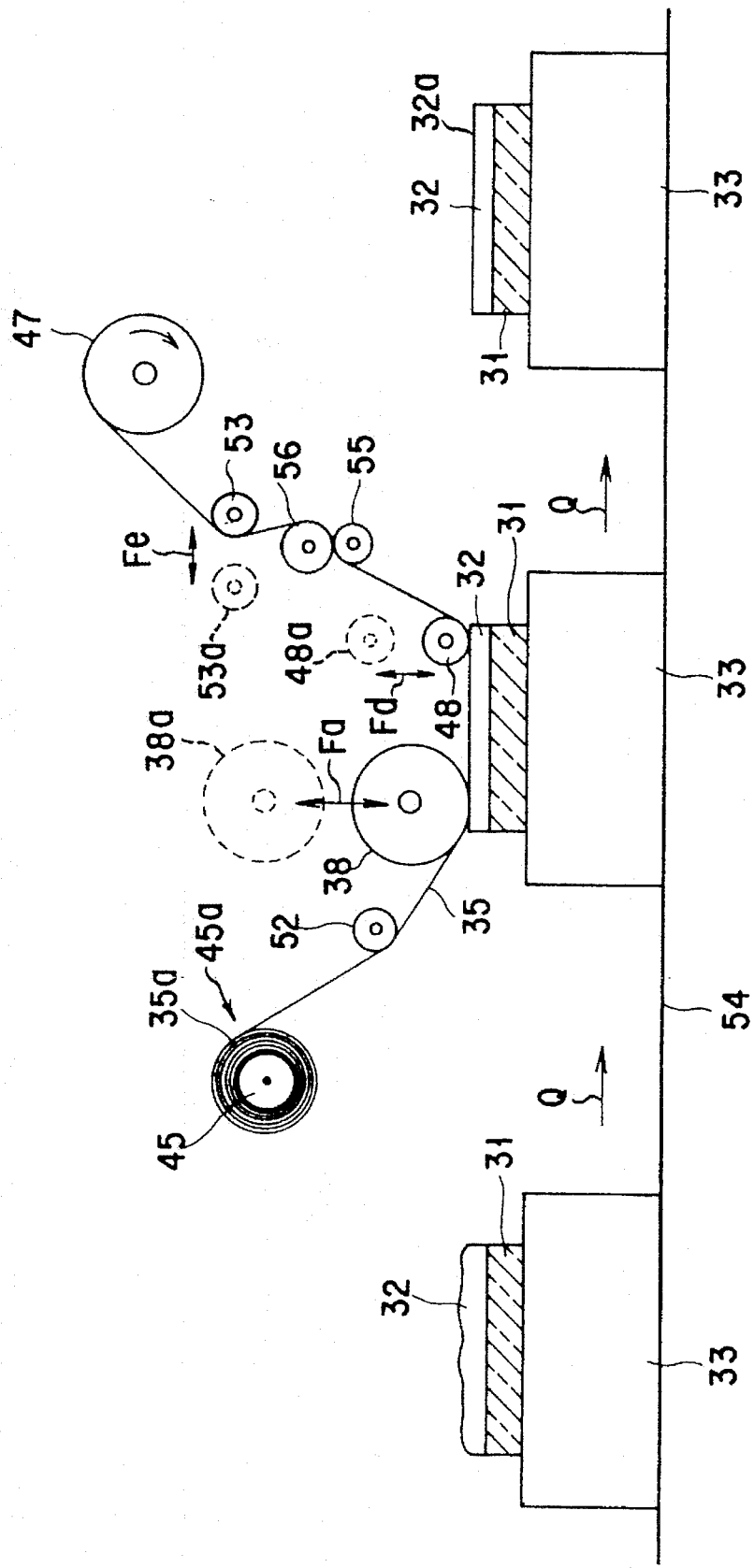
FIG. 9 is a schematic side view, showing a further embodiment of the invention.

In the apparatus shown in FIG. 9, a heating plate 33 is disposed on a belt conveyer 54 immovable in the vertical direction, and a glass substrate 31 printed with a color ink layer 32 is placed on the plate 33. The substrate 31 and layer 32 are heated by the heating plate 33. The apparatus also employs a resin film supply 45a, a resin film 35, a heating/pressing roller 38, a film-releasing roller 48, and a film-winding roller 47, which are similar to those shown in FIG. 8. However, a pair of rollers 55 and 56 are provided downstream of the film-releasing roller 48, and a movable film-pulling roller 53 is provided downstream of the rollers 55 and 56. The resin film 35 is supported by the roller 53. The roller 53 can move to a position 53a indicated by the broken line. The film-releasing roller 48 and pulling roller 53 cooperate to effectively and instantly release the resin film 35 from the color ink layer 32 having been smoothed, as will be explained hereinafter.

The structure of FIG. 9 may be modified such that the roller 53 is used to prevent meandering of the film 35, and that the roller 56 is movable to function as a film-pulling roller. In this modification, it is more desirable to wind the resin film 35 counterclockwise onto the roller 55 from below, wind clockwise onto the pulling roller 56, wind counterclockwise onto the roller 53, and make the pulling roller 56 movable to a position 53a indicated by the broken line.

The operation of the apparatus of FIG. 9 will be explained with reference to FIGS. 10–15.

Figure 10:
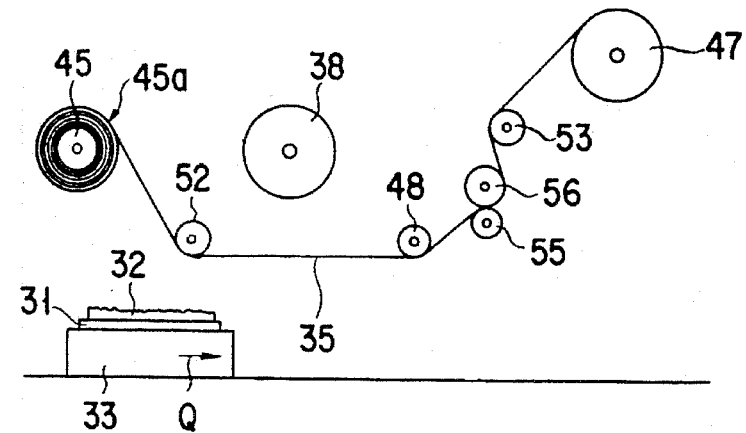
FIG. 10 is a schematic side view, useful in explaining the initial stage of the operation of the apparatus shown in FIG. 9.

As is shown in FIG. 10, the glass substrate 31 on which the color ink layer 32 is printed is held on the heating plate 33 by using vacuum pressure, with the layer 32 facing upward, and is heated at all times. Until the heating plate 33 reaches the heating/pressing roller 38, the roller 38 and film-releasing roller 48 are kept up. When the plate 33 reaches a position just this side of the heating roller 38 at a time point of A (in FIG. 5), the winding roller 47 is rotated to forward the resin film 35 to the right in FIG. 9, thereby bringing that portion of the resin film 35 which has not been used yet into contact with the color ink layer 32 to be smoothed.

Figure 11:
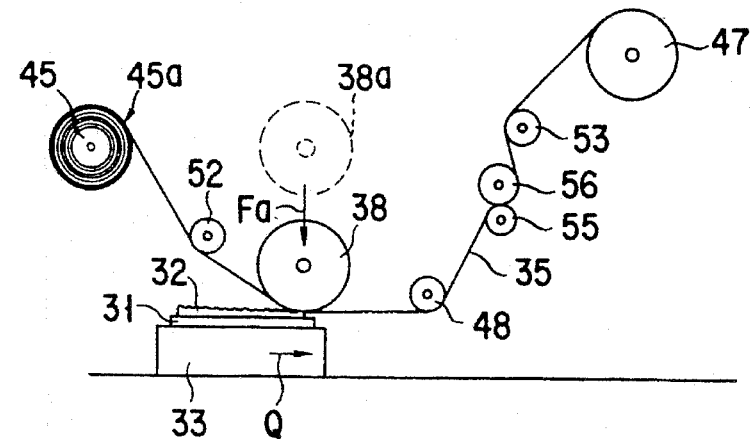
FIG. 11 is a schematic side view, showing an operational stage next to that shown in FIG. 10.
Figure 12:
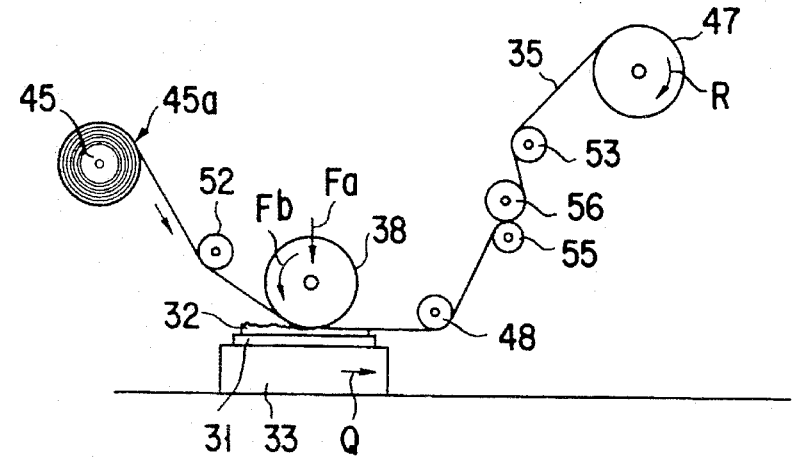
FIG. 12 is a schematic side view, showing an operational stage next to that shown in FIG. 11.
Figure 13:
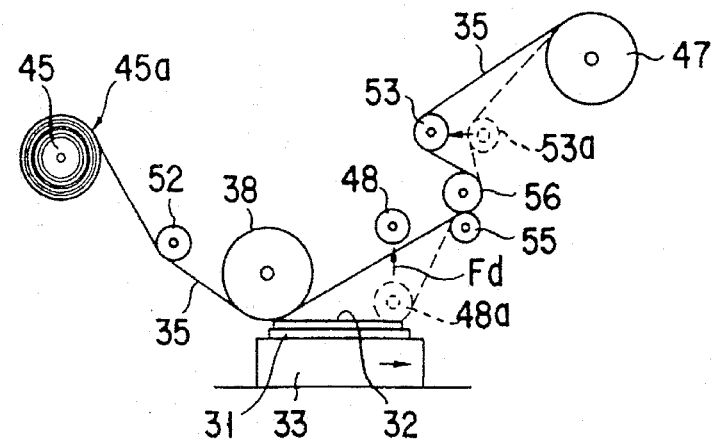
FIG. 13 is a schematic side view, showing an operational stage next to that shown in FIG. 12.

Thereafter, at a time point of B at which the heating plate 33 reaches under the heating roller 38, the heating roller 38 and film-releasing roller 48 are moved down, to press and smooth the color ink film 32 with a predetermined force at a time point of C, as is shown in FIG. 11. During pressing and smoothing the film 32, the resin film 35 is moved rightward in accordance with movement of the plate 33 and rotation of the roller 38, as is shown in FIG. 12. The forwarding roller 45 and winding roller 47 supply the resin film 35 with an appropriate tensile force which absorbs thermal expansion thereof.

After the entire surface of the color ink layer 32 of the glass substrate 31 is smoothed, the film-releasing roller 48 is moved upward and the pulling roller 53 is moved to the left from the position 53a at a time point of D, thereby strongly pulling upward the resin film 35 from a portion corresponding to an end of the color ink layer 32 remote from the heating roller 38, to a portion corresponding to the other end of the same, to instantly release the resin film from the color ink layer. The apparatus according to this embodiment may be modified such that no pulling rollers are employed, and that the winding roller 47 is rotated momentarily at high speed in the forward direction, thereby imparting a strong tensile force to the resin film to release the same. Where the releasing speed was set to 0.2–1 sec for a color ink film being 25 cm from one end to the other end, no wrinkles were found on the color ink film obtained after the smoothing treatment. Therefore, it is desirable to set the film releasing speed to 0.8–4 sec/m.

Figure 14:
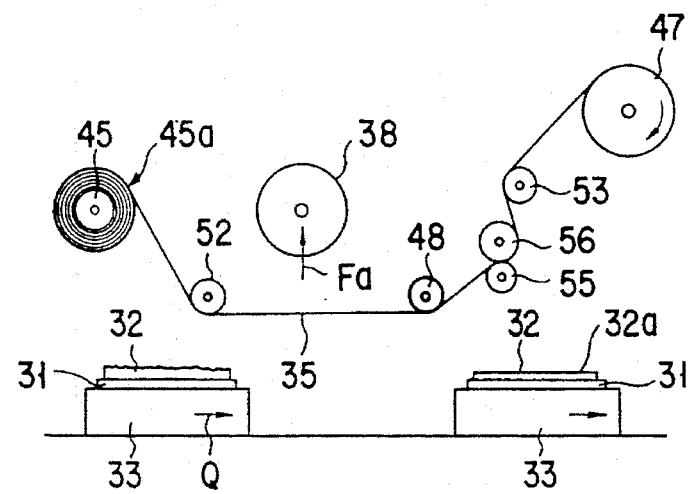
FIG. 14 is a schematic side view, showing an operational stage next to that shown in FIG. 13.
Figure 15:
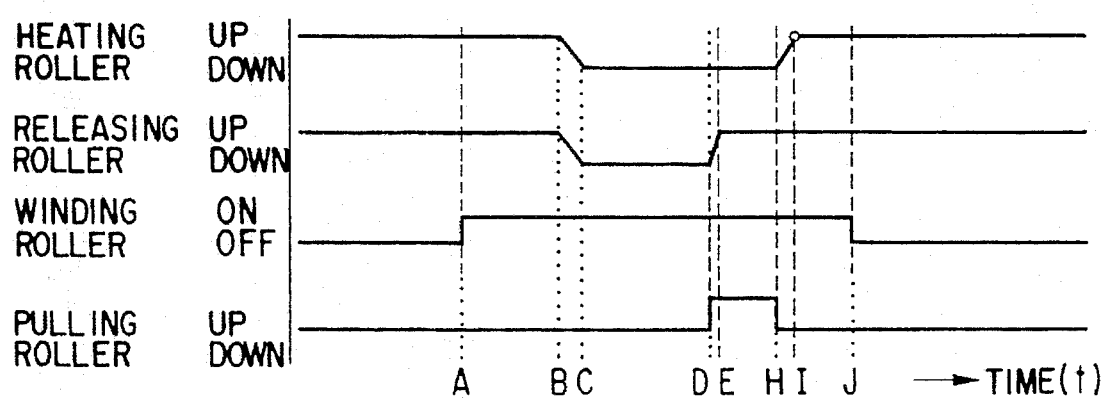
FIG. 15 is a view, showing continuous operation of each roller employed in the apparatuses shown in FIGS. 10–14.

As is shown in FIG. 14, at a time point of I after releasing, the pulling roller 53 is returned to the original position, and the heating roller 38 and film-releasing roller 48 are moved up, thereby subjecting the next color filter placed on another heating plate 33, to the smoothing treatment. This operation is automatically repeated by the use of a sequence control device employing a known micro computer, and mass production can be made at a relatively high speed.

(Embodiment 6)

In the apparatus shown in FIG. 16, a heating plate 33 is fixed in position, and a heating/pressing roller 38 located above the plate 33 is moved while being rotated, to thereby smooth a color ink layer 32 on a glass substrate. A resin film 35 is located obliquely to the surface to be smoothed. A film-releasing roller 48 is located in an extension line of the surface of the color ink layer 32, and is kept in contact therewith during the layer 32 being smoothed. After the entire surface of the layer 32 is smoothed, the film-releasing roller 48 is moved up, and a pulling roller 53 is moved leftward, thereby obliquely pulling the resin film from a portion corresponding to an end of the color ink layer 32 remote from the heating roller 38, to a portion corresponding to the other end of the same, to instantly release the resin film.

Though the above-described apparatuses are applied to a color filter for use in a color liquid crystal display device, the invention is not limited to this, but may be applied to other electron devices in which it is necessary to smooth various patterns attached to a substrate, directly or with a layer interposed therebetween, or to smooth a flat resin layer. The following embodiment is an example of such application.

(Embodiment 7)

To manufacture a thermal printing head using a metal substrate, a metal substrate made of an Fe alloy, which contains 16–18% by weight of Cr and has a thickness of 0.5 mm, was prepared. The substrate was dipped in dilute sulfuric acid (an aqueous solution containing 5–20% by volume of 96% $H_2SO_4$) for 1–2 minutes, thereby activating the surface thereof. Thereafter, polyamic acid, precursor of polyimide serving as a resin layer, was coated on one of the surfaces of the substrate in the form of stripes. Part of a solvent contained in the coated layer was removed at a temperature of 60°–120° C. at which polyamic acid would not changed to polyimide. Then, smoothing treatment was performed by the use of an apparatus and method according to any of the above-described embodiments. The conditions of the smoothing treatment was as follows:

Resin film: consisting of a biaxial PET having a thickness of 20–50 μm and coated with a releasing agent made of addition-type silicone;

Smoothing conditions:
Preliminary heating temperature . . . 80°–90° C.
Temperature of the heating roller . . . 90°–105° C.
Pressure (linear pressure) . . . 10–15 Kg/cm
Forwarding speed . . . 5–8 cm/min
Resin film-releasing speed: 1–3 sec/m (Advantages of the Invention)

As is explained above, the invention can provide, applying a relatively low pressure, an electron device having a very smooth resin coating layer. Though, in the invention, another resin layer is interposed between a heating roller and a resin coating layer to be smoothed, the interposed resin layer is very thin, and hence the invention can provide an effect substantially the same as that obtained by directly pressing the resin coating layer with the heating roller. Thus, the resin coating layer is pressed while being efficiently heated to a temperature substantially identical to its softening point. That is, the smoothing treatment is performed at a high thermal efficiency with a relatively low pressure, thereby increasing the treatment speed and mass productivity. Further, the resin film is disposed to obliquely contact the resin coating layer to be smoothed, and to be obliquely pulled up after the entire surface of the resin coating layer is smoothed, thereby being instantly released from the coating layer. Therefore, no air will remain in the surface of the coating film, and hence unevenness of the surface due to remaining air will not be found. Also, no wrinkles or the like will be caused on the surface, resulting in a very smooth resin coating layer.

We claim:

1. A method of manufacturing an electronic device comprising the steps of:
   (a) forming a color ink layer on a first surface of a substrate, the color ink layer containing a solvent and having a viscosity and an upper surface;
   (b) mounting the substrate on a surface of a heating plate so that a second surface of the substrate faces the surface of the heating plate; and
   (c) smoothing the upper surface of the color ink layer, which includes the steps of:
      (c1) drying the color ink layer so as to remove the solvent;
      (c2) placing a resin film directly on the upper surface of the dried color ink layer; and
      (c3) using a heating roller to press and heat the color ink layer through the resin film so as to flatten the upper surface of the dried color ink layer.

2. The method of manufacturing an electronic device according to claim 1, wherein step c further comprises the step of releasing the resin film from the upper surface of the dried color ink layer after upper surface of the dried color ink layer has been flattened.

3. A method of manufacturing an electronic device according to claim 2, which further comprises the step of heating the dried color ink layer after the resin film has been released so as to thermo-harden the dried color ink layer.

4. The method of manufacturing an electronic device according to claim 1, wherein the step c further comprises the steps of:
   maintaining the resin film on the upper surface of the dried color ink layer until the entire dried color ink layer is flattened; and
   releasing the resin film from the upper surface of the dried color ink layer after flattening the entire upper surface of the dried color ink layer.

5. The method of manufacturing an electronic device according to claim 4, wherein step a comprises the step of forming the color ink layer on the entire first surface of the substrate.

6. A method of manufacturing an electronic device according to claim 1, wherein the step c3 comprises the step of heating the dried color ink layer to a temperature at which thermo-hardening of the dried color ink layer does not occur.

7. A method of manufacturing an electronic device comprising the steps of:
   (a) forming a plurality of color ink layers on a first surface of a substrate, the plurality of color ink layers containing a solvent and having a stripe, parallel line pattern, each of the color ink layers having a viscosity and an upper surface;
   (b) mounting the substrate on a surface of a heating plate so that a second surface of the substrate faces the surface of the heating plate; and
   (c) smoothing the upper surfaces of the color ink layers which includes the steps of:
      (c1) drying the color ink layers so as to remove the solvent;

(c2) placing a resin film directly on the upper surfaces of the dried color ink layers;

(c3) using a heating roller to press and heat the dried color ink layer through the resin film; and (c4) moving the heating roller in a longitudinal direction of the color ink layers so as to flatten the upper surfaces of the dried color ink layers while expelling air from a space between two of the dried color ink layers that are adjacent each other.

8. The method of manufacturing an electronic device according to claim 7, wherein step c further comprises the step of releasing the resin film from the upper surfaces of the dried color ink layers after the upper surfaces of the dried color ink layers have been flattened.

9. A method of manufacturing an electronic device according to claim 8, which further comprises the step of heating the dried color ink layers after the resin film has been released so as to thermo-harden the color ink layers.

10. The method of manufacturing an electronic device according to claim 7, wherein the step c further comprises the steps of:

maintaining the resin film on the dried color ink layers until flattening of the upper surfaces of all the dried color ink layers has been completed; and releasing the resin film from the upper surfaces of the dried color ink layers after flattening of the entire upper surfaces of all the dried color ink layers has been completed.

11. The method of manufacturing an electronic device according to claim 7, wherein the step a includes the step of forming the color ink layers on the entire first surface of the substrate.

12. A method of manufacturing an electronic device according to claim 7, wherein the step c3 comprises the step of heating the dried color ink layers to a temperature at which thermo-hardening of the color ink layers does not occur.

* * * * *